United States Patent
Paraschis et al.

(10) Patent No.: US 10,038,494 B1
(45) Date of Patent: Jul. 31, 2018

(54) PROACTIVE MULTI-LAYER MECHANISMS TO PROTECT PACKET-OPTICAL TRANSPORT NETWORKS

(71) Applicant: Infinera Corporation, Sunnyvale, CA (US)

(72) Inventors: Loukas Paraschis, Sunnyvale, CA (US); Parthiban Kandappan, Sunnyvale, CA (US); Marco Sosa, Sunnyvale, CA (US); Abhinava Shivakumar Sadasivarao, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/639,947

(22) Filed: Jun. 30, 2017

Related U.S. Application Data

(60) Provisional application No. 62/472,597, filed on Mar. 17, 2017, provisional application No. 62/453,553, filed on Feb. 2, 2017.

(51) Int. Cl.
*H04B 10/08* (2006.01)
*H04B 10/032* (2013.01)
*H04B 10/079* (2013.01)

(52) U.S. Cl.
CPC ....... *H04B 10/032* (2013.01); *H04B 10/0793* (2013.01); *H04B 10/0795* (2013.01); *H04B 10/07953* (2013.01)

(58) Field of Classification Search
CPC .............. H04B 10/032; H04B 10/0793; H04B 10/0795; H04B 10/07951; H04B 10/07953; H04B 10/07955; H04B 10/07957; H04B 10/079; H04B 10/0797; H04B 10/0799
USPC .................................... 398/25, 33, 26, 27, 28
See application file for complete search history.

(56) References Cited

U.S. PATENT DOCUMENTS

| | | | | |
|---|---|---|---|---|
| 7,146,098 | B1 * | 12/2006 | Warbrick | H04B 10/0795 398/2 |
| 8,135,280 | B2 * | 3/2012 | Zong | H04B 10/07955 398/34 |
| 8,442,398 | B2 * | 5/2013 | Li | H04B 10/0795 398/16 |
| 9,515,726 | B2 * | 12/2016 | Adam | H04B 10/07953 |

(Continued)

*Primary Examiner* — M. R. Sedighian
(74) *Attorney, Agent, or Firm* — David L. Soltz

(57) ABSTRACT

A method and apparatus for pro-active protection of packet-optical transport in a software defined network (SDN) controller are disclosed herein. The SDN controller may define a proactive protection threshold criterion based on based on a plurality of optical system performance metrics and may collect at least one measurement for each of the metrics. The SDN controller may then determine whether the proactive protection threshold criterion is met based on at least one of the collected measurements. Further, the SDN controller may select a protection mechanism and define a protection threshold criterion on a condition that the proactive protection threshold criterion is met. Also, the SDN controller may initiate proactive protection events based on the selected protection mechanism. The SDN controller may determine whether the protection threshold criterion is met. The SDN controller may implement one or more protection events on a condition that the protection threshold criterion is met.

20 Claims, 16 Drawing Sheets

(56) References Cited

U.S. PATENT DOCUMENTS

| | | | |
|---|---|---|---|
| 9,906,296 B2* | 2/2018 | Oda | H04B 10/07953 |
| 2003/0165340 A1* | 9/2003 | Jayaram | H04B 10/0793 398/9 |

* cited by examiner

| | Pro-active Re-route Mechanism–Workflow | | |
|---|---|---|---|
| Time | Monitoring Points | Description/Action | Link Capacity (Spectrum Occupancy) |
| $t=t_0$ | • Q+Factor$_{i+1...N}$ for every $\lambda_{i=1...N}$ between $O_5 \Leftrightarrow O_6$ WDM link (which carries end-to-end traffic $R_1$ and $R_2$)<br>• Optical amplifier output power of all the amplifiers between $\{O_5 \Leftrightarrow O_6\}$, $\{O_7 \Leftrightarrow O_8\}$ & $\{O_9 \Leftrightarrow O_{10}\}$ WDM links $(p_{out}^{l=1..M})$<br>• Round trip delay (RTD) per LSP over the WDM links, specifically for $\lambda_{i=1...3}$<br><br>(Configuring of the $T_{pp}$)<br>(Constant monitoring of there values)<br>(Optionally, can also be done at this stage → Configuring of $T_P$) | This is the "steady state" starting point.<br><br>The end-to-end traffic between $R_1$ and $R_2$ is going over the WDM links.<br><br>Specifically, 80 carriers in the $O_5 \Leftrightarrow O_6$ (which can accommodate up to 125 carriers in this fiber span), and 50 carriers in the $O_7 \Leftrightarrow O_8$ (which again can accommodate up to 125 carriers in this fiber span). | Optical link (SRLG): $O_5 \Leftrightarrow O_6$ (80/125 carriers in use)<br><br>Optical link (SRLG): $O_7 \Leftrightarrow O_8$ (50/125 carriers in use)<br><br>Optical link (SRLG): $O_9 \Leftrightarrow O_{10}$ (10/125 carriers in use) |

FIG. 3A

Pro-active Re-route Mechanism-Workflow

| Time | Monitoring Points | Description/Action | Link Capacity (Spectrum Occupancy) |
|---|---|---|---|
| $t_1 = t_0 + n_1$ | • $T_{PP}$ criterion satisfied<br><br>(Satisfying $T_{PP}$ criterion - $F(X,Z)$)<br>(Choosing the right protection mechanism-A v/s B) | As the Q-Factor (measured) values exceeds 'α' the SDN Controller computer alternate paths for there carriers. The following are the options:<br>A. Switch these to optical path $R1 \Leftrightarrow O1 \Leftrightarrow O5 \Leftrightarrow O7 \Leftrightarrow O8 \Leftrightarrow O6 \Leftrightarrow O3 \Leftrightarrow R2$ ✗<br>  • But the end-to-end RTD exceeds the required SLA of '$\delta_i$' for carriers $\lambda_{i=1..8}$<br>B. Trigger L3 restoration/ protection ✓<br>  • Results in Router R1 finding an alternate L3 path (over WDM); $R_1 \Leftrightarrow R_3 \Leftrightarrow O_9 \Leftrightarrow O_{10} \Leftrightarrow R_4 \Leftrightarrow R_2$ -meeting RTD requirements | Optical link (SRLG): $O_5 \Leftrightarrow O_6$ (80/125 carriers in use)<br><br>Optical link (SRLG): $O_7 \Leftrightarrow O_8$ (50/125 carriers in use)<br><br>Optical link (SRLG): $O_9 \Leftrightarrow O_{10}$ (10/125 carriers in use) |

Pro-active Re-route Mechanism-Workflow

| Time | Monitoring Points | Description/Action | Link Capacity (Spectrum Occupancy) |
|---|---|---|---|
| $t_2 = t_1 + n_2$ | • Protection event happens (based on $T_{PP}$ criterion)<br>• (Implementing the appropriate protection switching mechanism- due to $T_{PP}$)<br>• (If required/desired, determine and configure a $T_P$ criterion - If it hasn't already been specified earlier) | The SDN Controller triggers L3 restoration/protection for carriers $\lambda_{i=1..8}$<br>Results in Router R1 finding an alternate L3 path (over WDM):<br>$R_1 \Leftrightarrow \underline{R_3} \Leftrightarrow \underline{O_9} \Leftrightarrow \underline{O_{10}} \Leftrightarrow \underline{R_4} \Leftrightarrow R_2$ | <u>Optical link (SRLG)</u>:<br>$O_5 \Leftrightarrow O_6$(80 72/125 carriers in use)<br><u>Optical link (SRLG)</u>:<br>$O_7 \Leftrightarrow O_8$(50/125 carriers in use)<br><u>Optical link (SRLG)</u>:<br>$O_9 \Leftrightarrow O_{10}$(10 18/125 carriers in use) |

FIG. 3C

Pro-active Re-route Mechanism-Workflow

| Time | Monitoring Points | Description/Action | Link Capacity (Spectrum Occupancy) |
|---|---|---|---|
| $t_3=t_2+n_3$ | • $T_P$ Criterion satisfied<br>• Because the measured Raman pump optical amplifier output power of all the amplifier between $(O_5 \Leftrightarrow O_6)$ WDM link $(P_{out}^{l=1..M})$ approaches $T_{PP}$ threshold 'Y' dBm<br><br>(Satisfying $T_P$ criterion - $F(Z)$) | As the measured Raman amplifier output power approached 'ß' dBm on $\{O_5 \Leftrightarrow O_6\}$ WDM link, all the 72 carriers $(\lambda_{1=9..80})$ on this link face the prospect of disruption.<br><br>However, there carriers *do not* have the same latency SLA requirements (acceptable to have higher RTD) | Optical link (SRLG):<br>$O_5 \Leftrightarrow O_6$(72/125 carriers in use)<br><br>Optical link (SRLG):<br>$O_7 \Leftrightarrow O_8$(72/125 carriers in use)<br><br>Optical link (SRLG):<br>$O_9 \Leftrightarrow O_{10}$(18/125 carriers in use) |

Pro-active Re-route Mechanism-Workflow

| Time | Monitoring Points | Description/Action | Link Capacity (Spectrum Occupancy) |
|---|---|---|---|
| $t_4 = t_3 + n_4$ | • Protection event happens (based on $T_P$ criterion)<br><br>(Implementing the appropriate protection switching mechanism-due to $T_P$) | The SDN Controller computer alternate pathsfor there carriers, resulting in the following path:<br>R1⇔O1⇔O5⇔O7⇔O8⇔O6⇔O3⇔R2 ✓ | Optical link (SRLG):<br>$O_5$⇔$O_6$(0/125 carriers in use)<br><br>Optical link (SRLG):<br>$O_7$⇔$O_8$(122/125 carriers in use)<br><br>Optical link (SRLG):<br>$O_9$⇔$O_{10}$(18/125 carriers in use) |

Pro-active Re-route Mechanism-Workflow

| Time | Monitoring Points | Description/Action | Link Capacity (Spectrum Occupancy) |
|---|---|---|---|
| $t_5 = t_4 + n_4$ | New steady state | The state of the network after the SDN Controller performs pro-active L0+L3 protection | Optical link (SRLG): $O_5 \leftrightarrow O_6$ (0/125 carriers in use) <br><br> Optical link (SRLG): $O_7 \leftrightarrow O_8$ (122/125 carriers in use) <br><br> Optical link (SRLG): $O_9 \leftrightarrow O_{10}$ (18/125 carriers in use) |

FIG. 3F

PROACTIVE MULTI-LAYER MECHANISMS
TO PROTECT PACKET-OPTICAL
TRANSPORT NETWORKS

CROSS REFERENCE TO RELATED
APPLICATIONS

This application claims the benefit of U.S. Provisional Application No. 62/453,553 filed Feb. 2, 2017 and U.S. Provisional Application No. 62/472,597 filed Mar. 17, 2017, the contents of which are incorporated by reference as if fully set forth herein.

FIELD OF INVENTION

The disclosed embodiments are generally directed to packet-optical transport network protection. Specifically, the disclosed embodiments are directed to the pro-active protection of packet-optical transport networks.

BACKGROUND

Internet Protocol (IP), such as IP over Ethernet, based packet transport over wavelength division multiplexing (WDM) systems has become the standard, and widely deployed, network architecture. Accordingly, this architecture includes at least an IP layer and a WDM layer and is typically referred to as a packet-optical transport architecture. Further, this architecture may include additional intermediate layers, such as a multi-protocol label switching (MPLS) layer and an Optical Transport Network (OTN) layer between the higher IP layer and the lower WDM layer.

In currently operating packet-optical networks, protection is performed predominantly at a packet layer, which may be the IP layer or, typically, a combination of the IP layer and the MPLS layer. Such layers can be acceptable for the requirements of packet-optical network protection mechanisms, which typically require responses of no more than a few tens of milliseconds.

SUMMARY

A method and apparatus for pro-active protection of packet-optical transport in a software defined network (SDN) controller are disclosed herein. The SDN controller may define a proactive protection threshold criterion based on based on a plurality of optical system performance metrics and may collect at least one measurement for each of the metrics. The SDN controller may then determine whether the proactive protection threshold criterion is met based on at least one of the collected measurements. Further, the SDN controller may select a protection mechanism and define a protection threshold criterion on a condition that the proactive protection threshold criterion is met.

Also, the SDN controller may initiate one or more proactive protection events based on the selected protection mechanism. In addition, the SDN controller may determine whether the protection threshold criterion is met. The SDN controller may implement one or more protection events on a condition that the protection threshold criterion is met.

In addition, if the Tpp criterion is not met, the SDN controller may abort any previously initiated and currently activated proactive protection events. Further, the SDN controller may continue collecting and monitoring the one or more optical system performance metrics.

In an example, the SDN controller may include a proactive decision engine. Further, the SDN controller may be a hybrid SDN controller. In addition, the plurality of optical system performance metrics may include at least two of Q-Factor metrics, transmission metrics, reception metrics, photonic integrated circuit (PIC) metrics, digital signal processing (DSP) metrics, power metrics, chromatic dispersion metrics, signal to noise ratio metrics, bit error rate (BER) metrics, wavelength division multiplexing (WDM) metrics, crosstalk metrics, optical amplification gain level metrics, Erbium Doped Fiber Amplifier (EDFA) gain level metrics, Raman gain level metrics, optical fiber characteristic metrics, Optical Power Monitor (OPM) metrics, Optical Time Domain Reflectometry (OTDR) metrics, multi-protocol label switching (MPLS) tunnel utilization metrics, Optical Transport Network (OTN) tunnel utilization metrics and Label Switched Path (LSP) round-trip delay (RTD) metrics.

In a further example, the proactive protection threshold criterion may be met based on the collected measurements of a plurality of carriers. In an additional example, at least one of the proactive protection events may be proactive protection switching. Further, the proactive protection switching may be performed in a WDM layer.

BRIEF DESCRIPTION OF THE DRAWINGS

FIGS. 3A, 3B, 3C, 3D, 3E and 3F are workflow diagrams illustrating an example of a centralized SDN controller providing proactive protection in a multi-channel network;

DETAILED DESCRIPTION OF THE EMBODIMENTS

Figure 1:
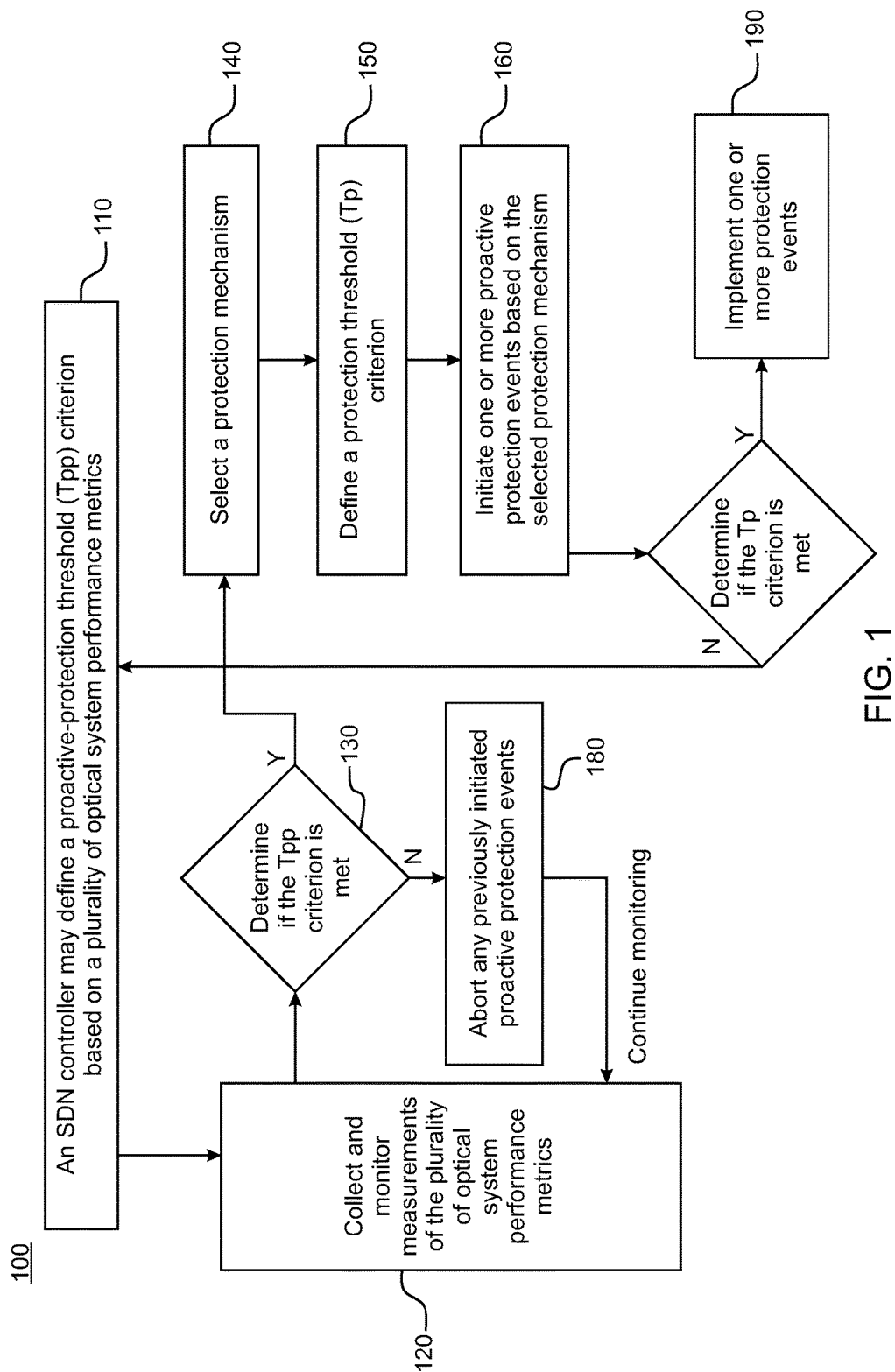
FIG. 1 is a flow chart illustrating an example of a software defined network (SDN) controller providing proactive protection in a packet-optical network.

Examples and embodiment described herein provide for improved protection in packet-optical transport networks. In a packet-optical network, optical signals carrying packets are transmitted from one node to another. In an example, a software defined network (SDN) controller using an SDN control plane may monitor and analyze, in real-time, optical system parameters for a packet-optical network. When a parameter value crosses a specific system performance threshold based on a predefined procedure, the SDN controller may pro-actively trigger an appropriate protection scheme, at the appropriate network layer. For example, the SDN controller may provide for pro-active re-routing of traffic to avoid failures. Further, the SDN controller may then predicatively evaluate a determined re-route path and determine if a parameter value crosses a specific system performance threshold for the re-route path. Based on the re-route path crossing a threshold, the SDN controller may then select another re-route path and evaluate that path. The SDN controller may continue to select and evaluate re-route paths until an acceptable re-route path is found.

The optical system parameters may include those used in systems having an FDR. Further, a plurality of optical system parameters may be monitored.

Also, the SDN control plane may be a multi-layer controlplane. Further, an all-SDN control plane approach or centralized control plane approach provides previously unattainable functions of pro-active re-routing of existing wavelength division multiplexing (WDM) service on a particular optical fiber or fiber path.

In an example, the SDN controller may enable WDM layer protection by pro-actively initiating all WDM system calibrations in ways that would accelerate the WDM system response time to be within the network acceptable time limits. Such proactive calibrations could also take into account specific network characteristics. In an example of multi-fiber network implementations, the SDN controller may combine analytics from multiple WDM systems to provide proactive protection. The SDN controller may then further implement protection events based on a determination that a protection threshold is met.

As used herein, an SDN controller may refer to one, several or all different types of SDN controllers known to one of ordinary skill in the art. These types of SDN controllers may include, for example, multilayer or single layer SDN controllers, and centralized controllers, de-centralized SDN controllers, or hybrid SDN controllers. A centralized controller may be considered to be a single entity which controls the underlying network. A de-centralized SDN controller may be considered to be a collection of federated SDN controllers that logically act as a centralized controller. A hybrid SDN controller may be considered to be a controller that operates on the SDN principles but also rely on nodal control plane such as generalized multi-protocol label switching (GMPLS). Further, a hybrid SDN controller is a mid-point control option between an all-SDN control plane approach and a legacy network element ("nodal") control plane approach, typically without SDN control. In a legacy control plane approach, each node may independently route its network traffic, whereas in an all-SDN control plane approach the SDN controller routes network traffic for each node. A native SDN control plane approach and a pure SDN control plane approach may refer to an all-SDN control plane approach, and the terms may be used interchangeably. Further, a hybrid SDN controller has the capabilities of a centralized SDN controller and program every node hop-by-hop along the end-to-end path on which a service needs to be created. Also, a hybrid SDN controller has the capabilities of a de-centralized SDN controller and program nodes using an embedded nodal control plane, such as, for example, GMPLS to indicate either the head-end node or tail-end node along the end-to-end path to create a service.

A native SDN controller may have complete visibility of device to device or port to port connectivity. In an example, an SDN controller may rely on data path verification tools to ensure connectivity correctness. Further, the SDN controller may initiate data path connectivity verification using trail-trace-identifiers (TTI), an Internet Protocol (IP) ping, a Label Switched Path (LSP) ping, and the like.

A hybrid SDN controller may have partial visibility of the underlying networks. In typical examples, a hybrid SDN controller may only be aware of edges of the layer or domain boundaries. Further, network devices which the SDN controller communicates with may send a summary to the Controller of the state of the network. Within the domain, the network devices may rely on an embedded control plane for routing and signaling. Also, path computation may be performed by the hybrid SDN controller with assistance from the embedded control plane. The SDN controller may communicate with the edge network devices and request them to setup services. The SDN controller may also monitor the edge network devices. Further, network devices in each of the layers may rely on the control plane to provision and re-route traffic. Additionally, the network devices may summarize the network state and inform the SDN controller of this summary by using border gateway protocol (BGP) BGP-link state (BGP-LS), path computation element protocol (PCEP) and the like.

Approaches using SDN controllers are improvements over prior methods and were previously unattainable. Network operators have long understood that packet layers, such as an IP layer, a multi-protocol label switching (MPLS) layer or both, can be acceptable for the requirements of packet-optical network protection mechanisms, which typically require responses of no more than a few tens of milliseconds. As a result, IP/MPLS protection mechanisms have been widely adopted. Accordingly, the use of a wavelength division multiplexing (WDM) layer for protection mechanisms has not been previously adopted because the protection mechanisms of WDM systems have been limited to response times in an order of minutes, which is thus a much slower response than required. As used herein, network operator may refer to traditional network service providers as well as content providers.

In order to mitigate WDM slow response times, elaborate WDM restoration mechanisms have been developed. However, these mechanisms have rarely been adopted since packet-level WDM restoration and WDM protection typical fail to achieve the performance needed for optical restoration in most cases and increase network management complexity. In addition, time division multiplexing (TDM)-based protection mechanisms, such as optical transport network (OTN) switching, have been developed to offer an alternative to IP/MPLS protection. However, TDM-based protection mechanisms have not been as widely adopted as IP/MPLS protection mechanisms for IP/MPLS packet transport.

While improving transport network protection by coordinating among the packet and optical network layers has long been very attractive, such protection has remained limited until now mainly due to the lack of a mature and effective coordination process. For example, network management system (NMS)/element management system (EMS) protection has been used in optical networks by network controllers but rarely available in optical routers. Further, NMS/EMS has been too slow for effective coordination among the packet and optical transport layers. Also, while GMPLS has been defined as a unified control-plane in order to extend the IP/MPLS control-plane paradigm to optical networks, GMPLS has not been effectively adopted for multi-layer protection.

In another example, multi-layer proactive protection mechanisms may use pre-forward error correction (FEC) WDM information. However, in practical application, these mechanisms provide IP/MPLS layer only protection and not WDM layer protection. Further, the adoption of these mechanisms have been limited by their single channel nature, which limits the ability of these mechanisms to define an appropriate proactive trigger for most network protection cases.

Recent SDN evolution of networks using IP/MPLS layers to include a hybrid control plane, or even a centralized only control plane, shall enable beneficial control for packet-optical transport, in implementations with or without GMPLS. A hybrid control plane may be considered to be a hybrid of a centralized control plane and a de-centralized control plane. In a specific example, an SDN controller may interface directly with IP/MPLS and optical layers independently. In a further example, the SDN controller may interface only with the IP/MPLS layer(s), which may use GMPLS to interact with the optical layer.

In addition, traditional static WDM layer monitoring made limited use of optical system analytics and typically, the FEC bit error rate (BER) was the main parameter monitored in optical networks. However, newer, coherent, flex-grid WDM systems have provided significant motivation for the development of more advanced optical system analytics applied at the WDM layer. For example, a "flight data recorder" (FDR) may include a database that stores hundreds of optical system parameters that can be used for such system analytics. These parameters are updated either frequently or continuously such that up-to-date analytics can be provided. Further, the introduction of SDN control by an SDN controller has motivated a significant advancement in network analytics frameworks, such as for information collection and sharing, across all of the layers of a packet-optical transport network. For example, an SDN Controller can collect the results of streaming telemetry schemes from one or more network elements/devices at a relatively high rate. The SDN controller may then run analytics based on the collected results.

Figure 4:
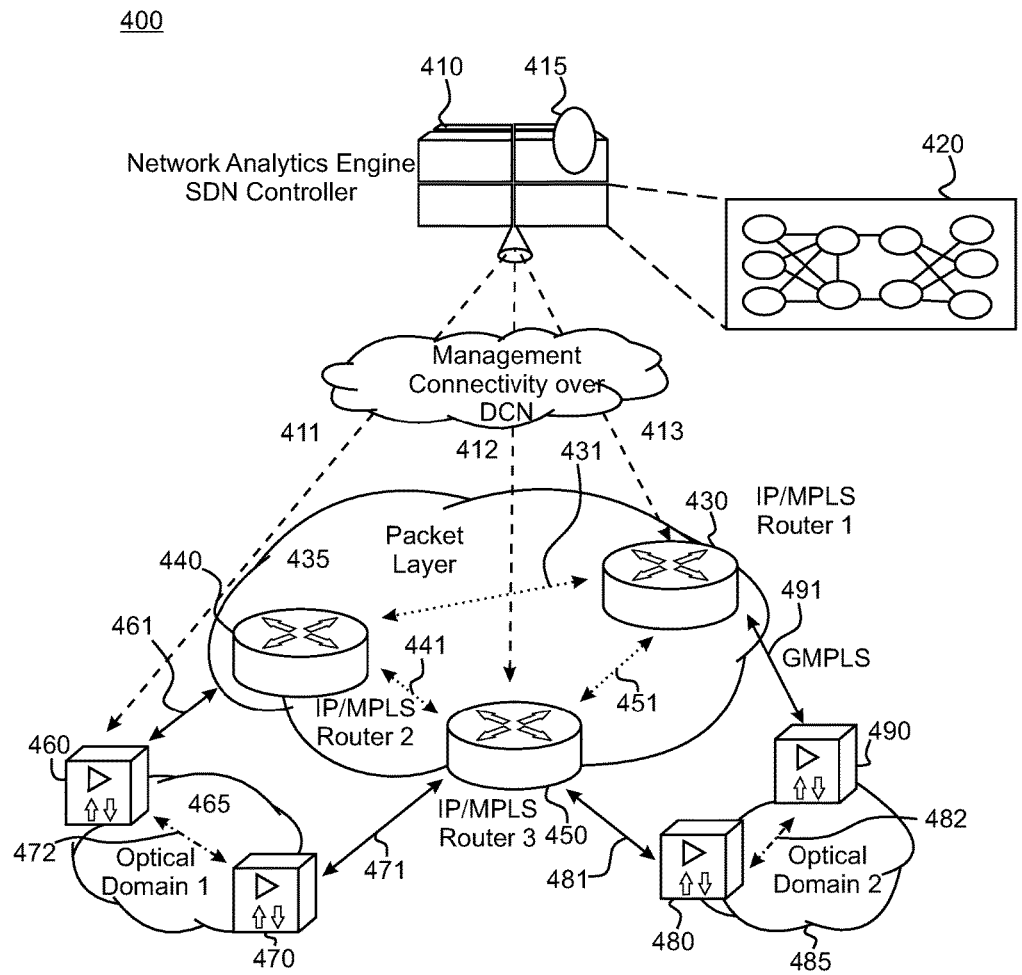
FIG. 4 is a network diagram illustrating an example of an SDN controller providing proactive protection in a multi-fiber network across both the packet layer and the optical layer.
Figure 9:
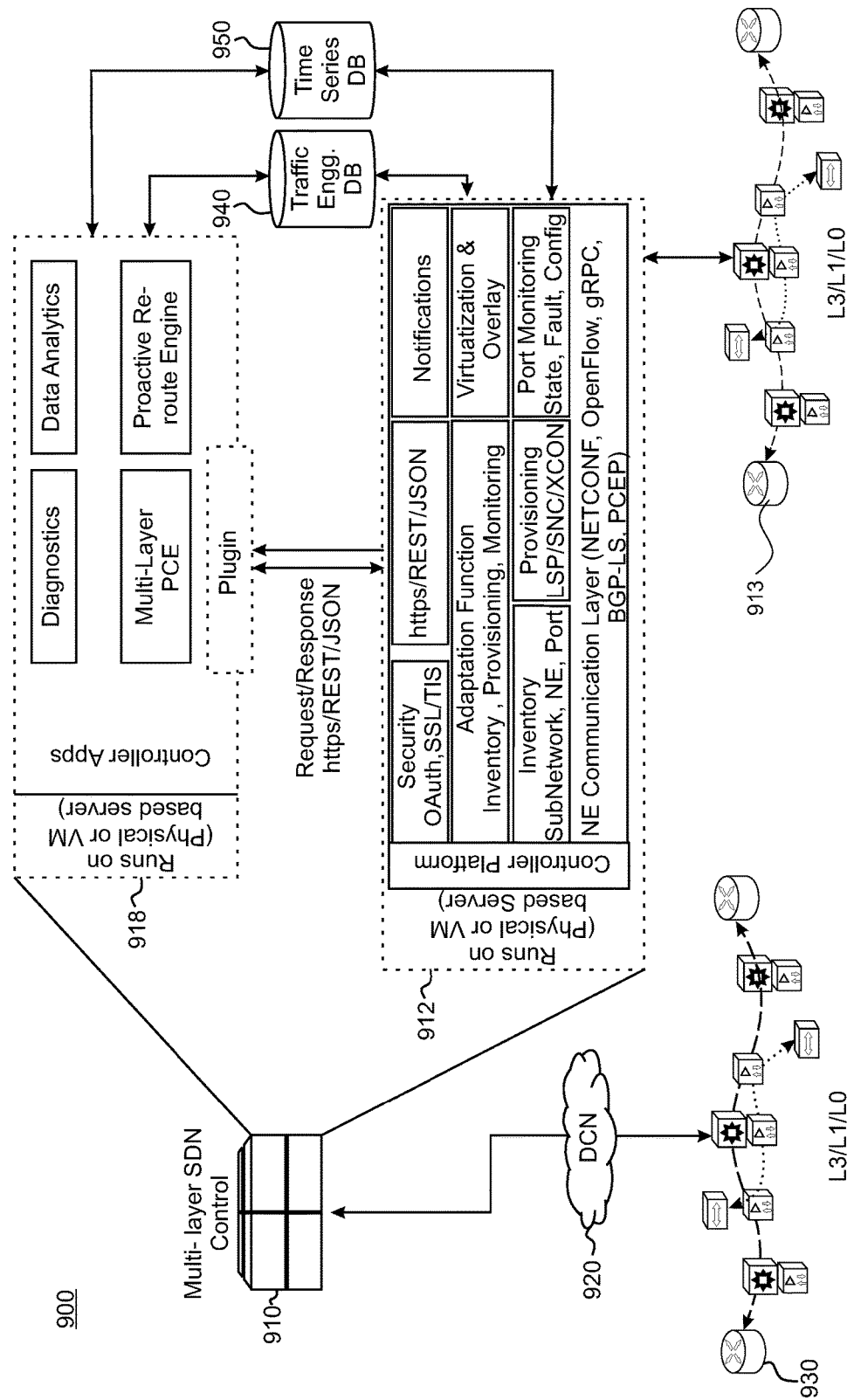
FIG. 9 is a network diagram illustrating an example of a multi-layer SDN controller providing proactive protection in a multi-fiber network, and the platforms and applications of the SDN controller.

FIG. 1 is a flow chart illustrating an example of an SDN controller providing proactive protection in a packet-optical network. As shown in an example in chart 100, an SDN controller may define a proactive-protection threshold (Tpp) criterion based on a plurality of optical system performance metrics, at step 110. The SDN controller may then collect, monitor and store the a plurality of optical system performance metrics, step 120. In an example, a generic remote procedure call (gRPC) may periodically send or stream measured optical system performance metrics from an optical device in the network to the SDN controller. In this way, the SDN controller may monitor the optical system performance metrics. Further, the optical system performance metrics may be archived in a network analytics time series database, which may complement the SDN controller. The database may be a database as shown in FIG. 4, FIG. 9 or both.

Further, the SDN controller may perform active profiling of the optical system performance metrics. For example, based on the archived optical system performance metrics, the SDN controller may build a correlation hysteresis to identify threshold crossing events.

Accordingly, while conducting continuous collection and monitoring, the SDN controller may determine if the defined Tpp criterion is met 130. If the Tpp criterion is met, the SDN controller may select a protection mechanism 140. In an example, the protection mechanisms may be pre-defined by a network operator. Also, the Tpp criterion may be pre-defined by a network operator.

In another example, the protection mechanisms may not be pre-defined by the network operator. In addition, the Tpp criterion may be pre-defined with a default criterion, such as a default event or condition. In an example, a default criterion may be a Q-Factor, as explained further below.

In addition, the SDN controller may define a protection threshold (Tp) criterion 150. Further, the SDN controller may then initiate one or more proactive protection events based on the selected protection mechanism 160. In an example, the SDN controller may program the required layer 3/layer 0 connections/LSPs on alternate paths and switch the end-to-end traffic over these alternate paths. For example, the SDN controller may use device programmable application programming interfaces (APIs), such as OpenFlow and the like, to initiate the one or more proactive protection events.

Also, the SDN controller may determine if the Tp criterion is met 170. In an example, the Tp criterion may be more stringent as the Tpp criterion. If another example, the Tp criterion may be the same as the Tpp criterion. In an example, the Tp criterion may be met if the SDN Controller observes an equipment degrade (EQPT-DEGRADE) alarm anywhere in the network. Such an EQPT-DEGRADE may be emitted when a hardware component, such as a photonic integrated circuit (PIC), wears out. Further examples of Tp criteria are provided elsewhere herein. If the Tp criterion is met, the SDN controller may implement one or more protection events 190.

If the Tp criterion is not met, the SDN controller may again define a Tpp criterion 110. Further, the SDN controller may continue collecting and monitoring the one or more optical system performance metrics 120. In addition, if the Tpp criterion is not met, the SDN controller may abort any previously initiated and currently activated proactive protection events 180. Further, the SDN controller may continue collecting and monitoring the one or more optical system performance metrics. Further, while the SDN controller implements steps 130 through 180, it may continue to collect and monitor the one or more optical system performance metrics. In these ways, the SDN controller may collect and monitor optical system performance metrics continuously.

In an example, the SDN controller may enable wavelength division multiplexing (WDM) layer protection by pro-actively initiating all WDM system calibrations in ways that would accelerate the WDM system response time to be within the network acceptable time limits. Such proactive calibrations could also take into account specific network characteristics. For example, the specific network characteristics of a point-to-point network could be taken into account. In another example, the specific network characteristics of a mesh network could be taken into account.

Further, proactive protection may include proactive tuning of spare WDM channels at a sufficient time before an actual protection event occurs, so that WDM response time meets required timelines. The spare WDM channels may be WDM channels that have been pre-deployed but initially unused until called upon. Further, the spare WDM channels may be used in a WDM PIC-based system. In typical examples, the required timelines usually measure less than a second.

In examples using a multi-fiber network, the SDN controller may use shared risk link group (SRLG) information. Specifically, the SDN controller may use the SRLG information to make protection switching decisions intelligently. For example, the SDN Controller may use the SRLG information to determine that one wavelength in the fiber is degrading, and may therefore infer a likely degradation of other wavelengths incident on the same fiber link.

In further examples, non-WDM layer protection may be improved by the SDN controller. For example, the SDN controller may advance packet protection by pro-actively initiating protection switching at the packet client layer, which will typically be the IP or MPLS layer. Such protection switching may be part of fast re-route (FRR). Further, the SDN controller may advance OTN protection, which may include optical carrier protection, by using this approach to pro-actively initiate protection switching at the OTN layer or any other TDM layer, most obviously for the case of non-IP/MPLS traffic that cannot be protected at the WDM layer.

As used herein, a carrier may refer to a channel or a wavelength and the terms may be used interchangeably. A trunk may refer to a link that may carry a plurality of carriers, channels or wavelengths.

The example mechanisms discussed herein may monitor multiple optical system performance parameters and allows the definition of performance metrics that combine many of these parameters to establish the most appropriate protection thresholds or criteria. In some examples, the mechanisms may monitor as many parameters as possible. As a result, the example mechanisms discussed herein extend well beyond prior solutions which consider only BER monitoring of a single WDM channel for IP/MPLS proactive protection. Importantly, the currently proposed correlation among multiple WDM channels may allow for much better proactive protection decisions by the SDN controller. For example, such improved proactive protection decisions may include distinctions between fiber-wide (or even multi-fiber) degradation versus channel-specific degradation. Such a distinction would be impossible through any single channel monitoring, like the ones proposed in prior solutions.

Typical example optical system performance parameters monitored by the SDN controller in the proposed example mechanisms discussed herein may include single-channel metrics of transmission and reception as measured or determined by a transmitter and/or receiver, including, for example, a PIC. Digital signal processing (DSP) metrics like power, chromatic dispersion, signal to noise ratio, BER, and the like. DSP metrics may be generated by the DSP, which may be implemented as specialized hardware, such as, for example, an application specific integrated circuit (ASIC). In addition to providing DSP metrics, DSP perform FEC, coherent detection and the like.

Other example parameters may include aggregated WDM channels metrics like power, crosstalk, optical amplification (Erbium Doped Fiber Amplifier (EDFA) or Raman) gain levels. Further, the SDN controller may even monitor optical fiber characteristics, such as loss, as these may become available from Optical Power Monitor (OPM) and Optical Time Domain Reflectometry (OTDR) functionality.

In a typical example, a network operator user may define a procedure or an algorithm including a system performance threshold that could trigger a pro-active protection event. For example, the procedure may determine if increasing levels of pre-FEC BER is a channels specific degradation, or a degradation observed among many, or potentially all, WDM channels in which case a whole-fiber pro-active protection event would be needed. Such a degradation observed among multiple WDM channels and the associated trigger of a pro-active protection event would have impossible in prior solutions, which typically considered only single channel effects.

In addition, compared with prior solutions, the use of the SDN controller in the proposed example mechanisms discussed herein allows for much more flexibility, and better optimization of the network layer at which the pro-active protection mechanism would be initiated, because an SDN controller can enable proactive protection at the WDM layer in addition to the packet IP/MPLS layer or the OTN layer, due to the SDN Controller having visibility to all of these layers at the same time. Such proactive protection at the WDM layer was not possible before under prior solutions. This is a new and significant improvement over those prior solutions which consider only IP/MPLS router based pro-active protection.

Moreover, the use of the SDN controller in the proposed example mechanisms discussed herein allows the SDN controller to have better visibility of activity of the network. Accordingly, the SDN controller may manage the network in a centralized way. For example, the SDN controller may make management decisions based on a full view of the network.

In addition, the use of the SDN controller in the proposed example mechanisms allows for decision making based on correlation of system analytics among different layers. For example, the system analytics may include OTN or MPLS tunnel utilization.

Further, the use of a stateful SDN controller further allows for network analytics with much better predictive ability. In an example, this predictive ability may be due to improved correlations of performance degradations with different timescales. One of ordinary skill in the art will understand that the lack of accurate predictive ability has been the main limitation of the proactive protection schemes which are based on single-parameter network-monitoring, such as those in prior solutions. In contrast to prior solutions, in the examples described herein, the proactive protection threshold criterion may be met based on the collected measurements of a plurality of carriers.

Also, the SDN controller in the proposed example mechanism allows for the use of heuristics and/or data mining techniques to perform predictive analyses on possible failures in the network, with a determined percentage of confidence, based upon historical data. The SDN controller may make different degrees of failure determination, such as, for example, determining if a group of fibers will fail or even if an individual fiber will fail.

As a result, the SDN controller provides for pro-active re-routing of traffic to avoid failures. Further, an all-SDN control plane approach or centralized control plane approach provides previously unattainable functions of pro-active re-routing of existing WDM service on a particular fiber path.

For example, a single optical carrier or optical channel (OCh) may be pro-actively re-routed to an alternate path. In a further example, a group of optical carriers or an optical channel group (OCG) may be pro-actively re-routed to an alternate path.

In examples described herein, the alternate path may be a pre-computed, dedicated path that matches the original path in characteristics and metrics one-to-one. The alternate path may be a backup to the existing original path, which may be susceptible to failures. In further examples described herein, the alternate path may be dynamically computed by the SDN controller, as the SDN controller profiles and monitors the health and metrics of the carrier or group of carriers, such as an OCh, OCG or both. Further, the SDN controller may also take into account SRLG information in order to infer the potential impact to a collection of carriers, such as on OCG, which share common resources.

The SDN controller may monitor one or more of several different types of optical parameters and may determine if a threshold is met based on an indicator of one of these parameters. For example, the SDN controller may monitor carrier parameters, WDM system parameters and fiber parameters. Specifically, the SDN controller may monitor a variety of carrier parameters, such as SRLG, which may be a logical parameter and BER, which may be an digital parameter. Further, the SDN controller may monitor a variety of analog carrier parameters, such as Q-Factor, transmission power, receive power, chromatic dispersion, polarization mode dispersion (PMD), jitter, and the like. Also, the SDN controller may monitor a variety of WDM system parameters, such as SRLG, EDFA-power, which may be an analog parameter, carrier count, which may be a digital parameter, and the like. In addition, the SDN controller may monitor a variety of fiber parameters, such as OTDR, which may be an analog parameter, and the like.

The SDN controller may use objective functions to represent the optimization coefficients of the state the network will be in if the re-route were to occur. There may be several objective functions which are associated with priorities. In an example, the SDN controller may set to objective functions, with a first objective function to evaluate low latency, least cost and/or hop count, and a second objective function to evaluate least cost, minimal regeneration and low power. For example, the SDN may set the following: $OF_1=\{$(low latency), (least cost), (lowest hop count)$\}$ and $OF_2=\{$(least cost), (minimal regeneration), (lower power)$\}$.

Figure 2A:
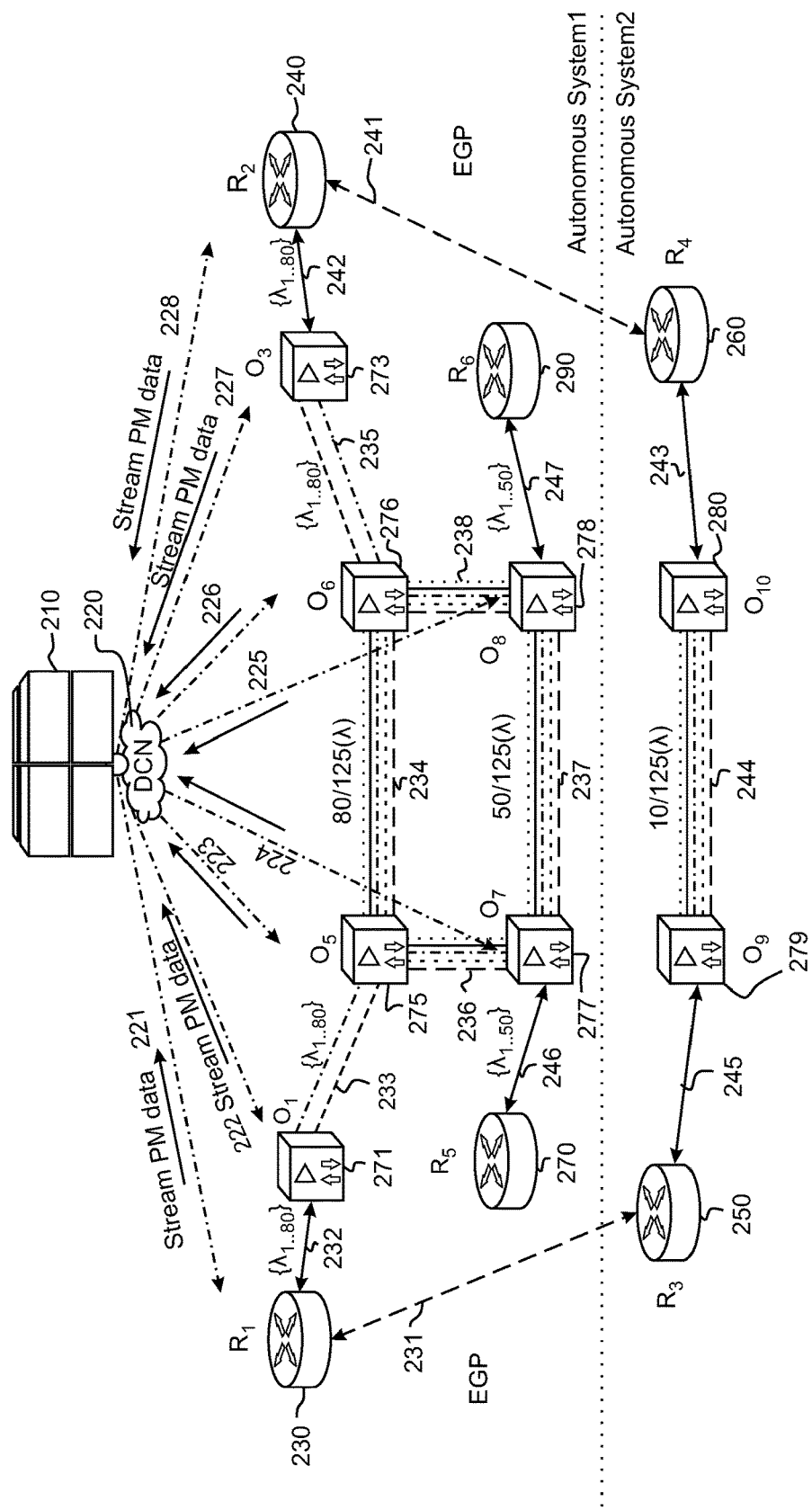
FIG. 2A is a network diagram illustrating an example of a centralized SDN controller providing proactive protection in a multi-channel network at steady state before pro-active protection is applied.
Figure 2B:
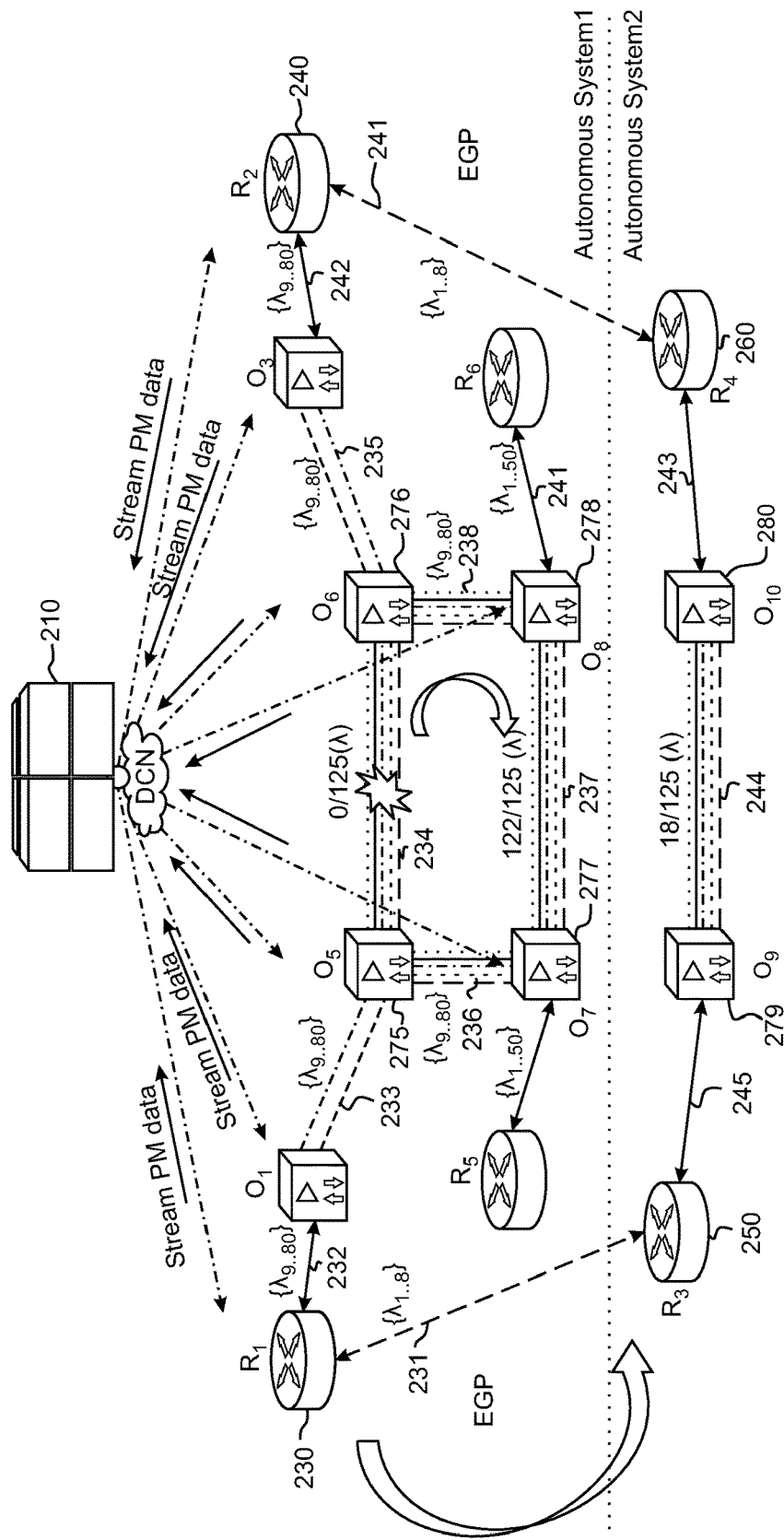
FIG. 2B is a network diagram illustrating an example of a centralized SDN controller providing proactive protection in a multi-channel network at end state after pro-active protection has been applied.

FIG. 2A is a network diagram illustrating an example of a centralized SDN controller providing proactive protection in a multi-channel network at steady state before pro-active protection is applied. FIG. 2B is a network diagram illustrating an example of a centralized SDN controller providing proactive protection in a multi-channel network at end state after pro-active protection has been applied. FIGS. 3A, 3B, 3C, 3D, 3E and 3F are workflow diagrams illustrating an example of a centralized SDN controller providing proactive protection in a multi-channel network. The examples shown in FIGS. 2A, 2B, 3A, 3B, 3C, 3D, 3E and 3F may be an example implementation of the process shown in FIG. 1.

In an example as shown in network diagram 200, SDN controller 210 may communicate and have management connectivity with one or more routers and/or one or more optical add/drop multiplexing (OADM) devices over communication paths in a management network, such as a data communications network (DCN) 220. For example, SDN controller 210 may communicate with router 230 over path 221, OADM 271 over path 222, OADM 275 over path 223, OADM 277 over path 224, OADM 278 over path 225, OADM 276 over path 226, OADM 273 over path 227, and router 240 over path 228. The routers and OADMs may stream performance monitoring (PM) data to SDN controller 210. The management connectivity implemented through communications 221-228 may use protocols such as Open-Flow, network configuration protocol (NETCONF), simple management network protocol (SNMP), command line interface (CLI), and the like. The SDN controller 210 may include a proactive decision protection engine (not shown in FIG. 2A or 2B), which may be complementary to the SDN controller 210. The routers 230, 240, 250, 260, 270, 290, may be IP/MPLS routers which may perform IP routing as well as MPLS encapsulation. OADM devices 271, 273, 275-280 may be layer 0 devices and may perform optical add/drop multiplexing. Further, each of OADM devices 271, 273, and 275-280 may be a re-configurable OADM (ROADM) or a fixed OADM (FOADM). In addition, routers 230, 240, 250, 260, 270, 290 and OADM devices 271, 273, 275-278 may be part of an autonomous system 1, while routers 250, 260 and OADM devices 279, 280 may be part of an autonomous system 2.

As shown in workflow diagram 300 of FIG. 3A, at stage 310, time $t=t_0$ the SDN controller 210 may define a Tpp as a threshold criterion based on a plurality of performance metrics. Stage 310 may correspond to step 110 of FIG. 1. In an example, Tpp may be a function of X, Y and Z (or F(X, Y, Z)), where X, Y and Z are performance metrics. In another example, Tpp may be a function of X and Y. Further, in an example, a user of the network operator may use representational state transfer (REST) and a RESTful API as a configuration interface to input the Tpp into the SDN controller 210.

In an example, performance metric X may be a single carrier or a single channel performance metric, such as Q-Factor, optical signal to noise ratio (OSNR), BER and the like. Such metrics may be indicative of per carrier or per channel health. For example, X may be set as a Q-Factor for every carrier (A), accordingly: $X = Q\text{-}Factor_{i=1 \ldots N}$ for every $\lambda_{1=1 \ldots N}$, where N represents the total number of carriers monitored by the SDN controller.

Further, performance metric Y may be a fiber physical performance metric, such as an optical Raman amplifier pump power ($P_{out}$) and the like. Such a fiber physical performance metric may be indicative of characteristics of the fiber, which may carry all of the channels together. As a result, fiber characteristics may impact all of the channels that ride over the fiber.

In addition, performance metric Z may be a service performance metric such as a LSP round-trip delay (RTD). The RTD may be the sum of channel propagation delay (PD) in each of the two directions in a path. RTD may be determined or computed through many ways. One way to determine RTD may include an ITU International Telecommunications Union (ITU) Telecommunications Standardization Sector (ITU-T) G.709 path delay measurement scheme to obtain carrier level latency. This measurement scheme may provide the RTD on a per-ODU k logical path. The RTD measurements may be performed on-demand or may be performed automatically at the direction of the SDN controller at pre-configured intervals.

In an example, the SDN controller 210 may set the Tpp thresholds including X and Z. Accordingly, the SDN controller 210 may set X as $Q\text{-}Factor_{i=1 \ldots N}$ for every $\lambda_{1=1 \ldots N}$ less than or equal to an a criterion for a path. In other words, the network operator may expect the Q-Factor for all of the channels of that path to be less than or equal to a. For example, based on inputs from a user of the network operator, the SDN controller 210 may set X as $Q\text{-}Factor_{i=1 \ldots N}$ less than or equal to $\alpha_i$ for every $\lambda_{1=1 \ldots N}$ for path 234 between OADM 275 and OADM 276, where N is 125 channels. Further, the SDN controller 210 may set Z as $RTD_{i=1 \ldots N}$ less than or equal to a $\delta_i$ criterion for every $\lambda_{i=1 \ldots N}$. The $RTD_{i=1 \ldots N}$ measures the delay over the path between router 230 and router 240. In an example, for path 234 between router 230 and router 240, α may be 7 and δ may be 4 ms. In further example, α may be expressed logarithmically. For example, for path 234 α may be 6.5 dB and δ may be 5 ms. Further, a may related to a system alarm/fault, such as a Q-SIGNAL-DEGRADE-alarm. Other example values of Q related to Q-SIGNAL-DEGRADE-alarm condition may include the range [9 dB to 15 dB].

In a further example, the SDN controller 210 may set Y as one of the Tpp thresholds. Specifically, the SDN controller 210 may set Y as $P_{out}$ is less than or equal to a β decibels (dB) criterion for Raman power for all of the Raman amplifiers $OADM_{i=1 \ldots M}$ along the WDM links on the path, where M is the total number of Raman amplifier OADMs along the path. For example, in a path between router 230 and router 240 may include link 232 to OADM 271, then link 233 to OADM 275, then link 234 to OADM 276, then link 235 to OADM 273 and finally link 242 to router 240. Accordingly, M may be 4 in that example as there are four OADMs along the path between router 230 and router 240. In an example β may be 55 dBs. Other paths that may be measured for a $P_{out}$ include path 237 between OADM 277 and OADM 278 and path 244 between OADM 279 and OADM 280. The above described examples are some of the ways that step 110 of FIG. 1 may be performed.

In addition, in an example, step 150 may be performed at stage 310. For example, at stage 310, the SDN controller 210 may define Tp thresholds. For example, the SDN controller 210 may define a Tp threshold as $P_{out}$ is less than or equal to a θ dB criterion for all of the Raman amplifiers $OADM_{i=1 \ldots M}$ along the WDM links on the path. In one example, θ may be set as equal to the β used for Y above. In another example, θ may be set as greater than the β used for Y above.

As the procedure shown in FIGS. 1, 2A, 2B, 3A, 3B, 3C, 3D, 3E and 3F progresses, one, more, or all of the above and below indicated parameters may be continuously monitored by the SDN controller 210 for pro-active traffic re-route. Such continuous monitoring is shown in step 120 of FIG. 1 and may start at stage 310 of FIG. 3A.

In an example, all services on carriers $\lambda_{i=1 \ldots N}$ may be required to meet the Q-Factor α criterion. However, services on carriers $\lambda_{1=1 \ldots 8}$ may be required to additionally meet the RTD $\delta_i$ criterion.

As shown in FIG. 2, the SDN controller 210 may combine analytics from multiple WDM systems to provide proactive protection. The different WDM systems may operate on different optical domains.

In an example, eighty (80) carriers may be needed by a network operator. The network may have a capacity of 125 carriers. For example links 234, 237 may each accommodate up to 125 carriers. In an example, each WDM fiber may accommodate up to 125 carriers, using, for example, the ITU C-Band spectrum at 1530-1565 nm wavelengths. While 80 and 125 carriers are shown, one of ordinary skill in the art will readily appreciate that many more carriers, even hundreds of carriers, may be used and still be consistent with the examples provided herein. The network operator may require the operation of 80 carriers in a path between router 230 and router 240. The SDN controller may then route the 80 carriers over a path including links 232, 233, 234, 235, 242.

In an example illustrating features of proactive protection, at step 130 in stage 320 of FIG. 3B, the SDN controller 210 may determine that the Tpp criterion is satisfied. For example, the SDN controller 210 may determine that the Q-Factor exceeds a for at least one of the 80 carriers on link 234. Therefore, link 234 should not be used in the path. As a result, the SDN Controller 210 may then pro-actively compute alternative paths and may select a protection mechanism 140 for one, some or all of the 80 carriers. In an example shown in FIG. 2 and FIG. 3, the SDN Controller 210 may pro-actively compute alternative paths and may select a protection mechanism 140 for all 80 carriers.

For example, the SDN controller 210 may plot a new potential path including links 232, 233, 236, 237, 238, 235, 242. However, the SDN controller 210 may determine that the end-to-end RTD exceeds the service level agreement (SLA) of $\delta_i$ for eight of the carriers ($\lambda_{1=1 \ldots 8}$). As a result, the SDN controller 210 may plot a separate, new path for the eight carriers which includes links 231, 245, 244, 243, 241 and which meet the RTD requirements of the eight carriers. Further, the SDN controller 210 may plot this new, separate path using layer 3 (L3) restoration and protection mechanisms. The remaining seventy-two (72) carriers of the 80 carriers may remain plotted on the path including links 232, 233, 236, 237, 238, 235, 242.

Further, at stage 330 in FIG. 3C, the SDN controller 210 may initiate one or more proactive protection events based on the selected protection mechanism 160. For example, the SDN controller 210 may establish the path for the eight carriers based on the plot. As a result, the SDN controller 210 may establish a path including links 231, 245, 244, 243, 241 for the eight carriers, as shown in FIG. 2B. In an example, links 231, 241 may use an exterior gateway protocol (EGP), which may be similar to a BGP or a BGP-LS.

In addition, at stage 330, SDN controller 210 may define the Tp criterion, if it has not already been established. The Tp criterion may be applicable to both the path including links 231, 245, 244, 243, 241 for the eight carriers and the path including links 232, 233, 236, 237, 238, 235, 242 for the remaining 72 carriers.

Moreover, at stage 340 in FIG. 3D, the SDN controller 210 may determine if the Tp criterion is met 170. In an example, the Tp criterion is met for the 72 carriers because the measured Raman pump amplifier optical output may approach the threshold θ dBm for link 234 between OADM 275 and OADM 276. Alternatively, the SDN controller 210 may determine if the Tpp criterion is met at this stage. In an example, the Tpp criterion is met for the 72 carriers because the measured Raman pump amplifier optical output may approach the threshold θ dBm for link 234 between OADM 275 and OADM 276.

At stage 340, as the measured Raman pump amplifier optical output may approach the threshold for link 234 between OADM 275 and OADM 276, all 72 carriers for this link face the prospect of disruption. However, these 72 carriers may not have the same latency SLA requirements as the other 8 carriers. For example, these 72 carriers may have higher acceptable RTD than the other 8 carriers.

Therefore, at stage 350 in FIG. 3E, the SDN controller 210 may establish the plotted path for the 72 carriers including links 232, 233, 236, 237, 238, 235, 242. Further, the SDN controller 210 may implement one or more protection events 190.

At stage 360 in FIG. 3F, the new steady state may be monitored by the SDN controller 210 for the newly established paths, as shown in FIG. 2B. If needed, the SDN controller 210 may continue to perform proactive L0 and L3 protection.

FIG. 4 is a network diagram illustrating an example of an SDN controller providing proactive protection in a multi-fiber network across both the packet layer and the optical layer. As shown in diagram 400, an SDN controller 410 may include a proactive decision engine 415 based on user defined thresholds. The SDN controller 410 may have multi-layer and multi-vendor capabilities. The user may be a manager of a network operator. Further, the SDN controller 410 and the proactive decision engine 415 may draw on one or more databases 420 for information about the network and network system performance metrics, such as, network topology, traffic engineering, performance monitoring and the like. The network may be an optical network. In an example, database 420 may be an FDR.

In an example shown in FIG. 4, the SDN controller 410 may have management connectivity over a management network, such as a DCN, with devices such as routers 430, 440, 450 and OADM devices 460, 470, 480, 490. The management connectivity may be implemented through communication channels, such as channels, 411, 412, 413, and may use protocols such as OpenFlow, NETCONF, BGP-LS, PCEP and the like. In an example case, BGP-LS and PCEP may be used in hybrid mode. The routers 430, 440, 450 may be IP/MPLS routers which may perform IP routing as well as MPLS encapsulation. OADM devices 460, 470, 480, 490 may be layer 0 devices and may perform optical add/drop multiplexing. Each of OADM devices 460, 470, 480, 490 may be a ROADM or a FOADM.

The routers 430, 440, 450 may communicate with each other on the packet layer 435 by way of intra-layer logical connectivity using links 431, 441, 451. For example, routers 430, 440, 450 may have router to router connectivity using logical connectivity, with physical connectivity through an underlying layer. The packet layer 435 may include both data plane and control plane connectivity.

OADM devices 460, 470, 480, 490 may communicate with each other on optical domains 465, 485 by way of inter-optical layer connectivity using links 472, 482. For example, OADM devices 460, 470 may have WDM device to WDM device connectivity with each other over link 472 and OADM devices 480, 490 may have WDM device to WDM device connectivity with each other over link 482. Such connectivity may include long-haul connectivity, such as over 80 kilometers (km), or shorter reach connectivity.

OADM devices 460, 470, 480, 490 may communicate with routers 430, 440, 450 by way of cross-layer port-to-port connectivity using links 461, 471, 481, 491. For example, OADM devices 460, 470 may have cross-layer connectivity with routers 440, 450 over links 461, 471, respectively. Similarly, OADM devices 480, 490 may have cross-layer connectivity with routers 450, 430 over links 481, 491, respectively. Such connectivity may include a short or medium reach optical fiber patch. For example, such connectivity may include 2 km, 10 km or 40 km range connectivity. This cross-layer connectivity may be between layer 3 and layer 1, layer 3 and layer 0 or layer 1 and layer 0.

Through the example connectivity shown in FIG. 4, the SDN controller may communicate with the network to follow the procedures provided in FIG. 2 and FIG. 3. For example, the SDN controller may communicate with the network using the example connectivity shown in FIG. 4 to determine if the Tpp criterion is met and if the Tp criterion is met.

Figure 5:
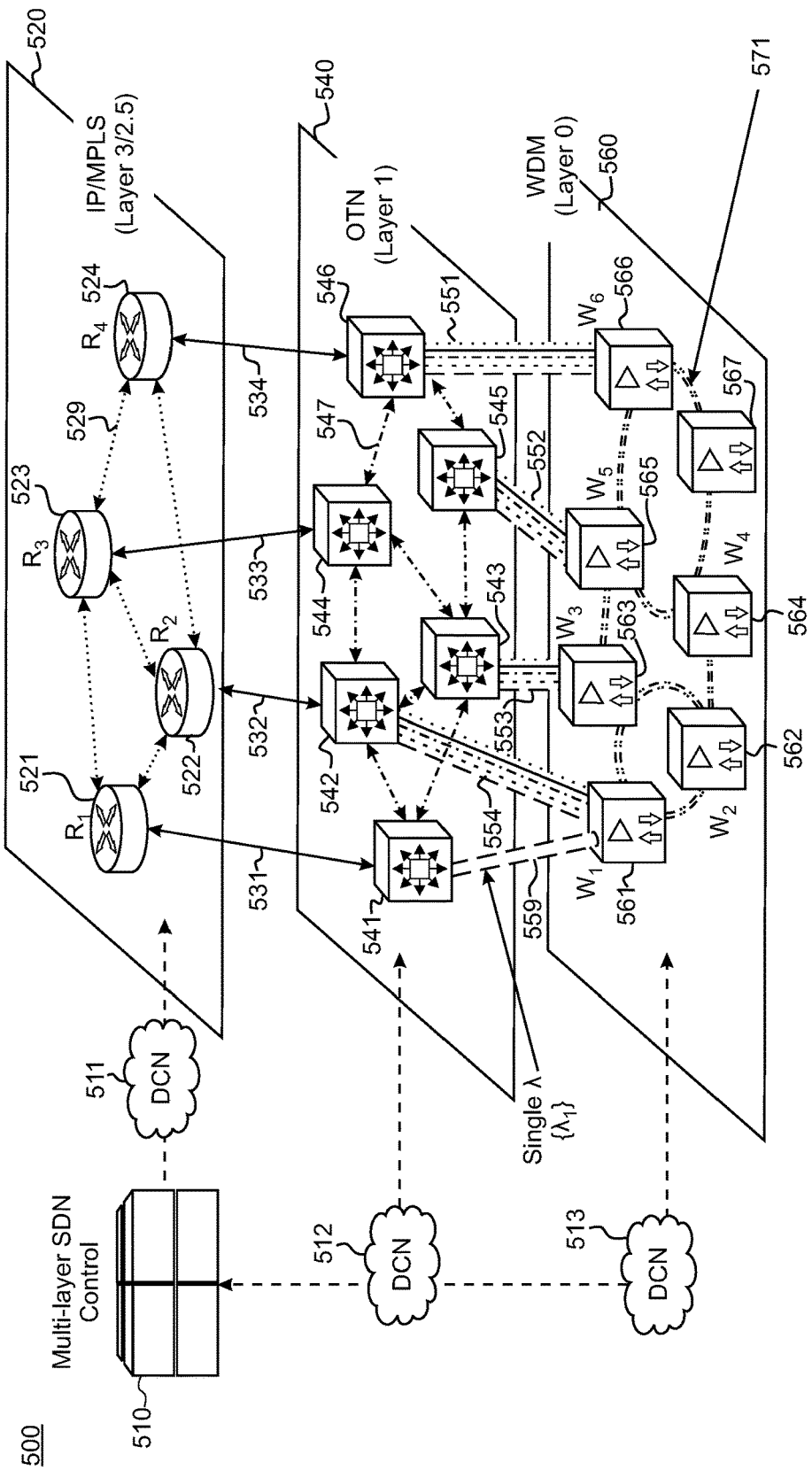
FIG. 5 is a network diagram illustrating an example of an SDN controller providing proactive protection in a multi-fiber network across the Internet Protocol (IP)/multi-protocol label switching (MPLS) layer, the Optical Transport Network (OTN) layer and the wavelength division multiplexing (WDM) layer.

FIG. 5 is a network diagram illustrating an example of an SDN controller providing proactive protection in a multi-fiber network across the IP/MPLS layer, the OTN layer and the WDM layer. As shown in diagram 500, the SDN controller 510 may have management connectivity over a management network, such as a DCN, through communication channel 511 with devices such as routers 521, 522, 523, 524 on IP/MPLS layer 520. The management connectivity may use protocols such as OpenFlow, NETCONF, BGP-LS, PCEP and the like. The IP/MPLS layer 520 may be considered to be layer 3, layer 2.5 or both. Further, the SDN controller 510 may have management connectivity through communication channel 512 with OTN network elements 541, 542, 543, 544, 545, 546 on OTN layer 540. The OTN layer 540 may be considered to be layer 1. The OTN network elements 541, 542, 543, 544, 545, 546 may be ITU-T G.709 capable. Further, the OTN network elements 541, 542, 543, 544, 545, 546 may perform layer 1 functions, such as grooming, multiplexing and switching of optical channel data unit (ODU) k connections and optical channel transport unit (OTU) framing and/or transport of k channels. The output of the OTN network elements 541, 542, 543, 544, 545, 546 may be pipelined to OADM devices, such as OADM devices 561, 562, 563, 564, 565, 566, such as in examples explained further herein. In addition, the SDN controller 510 may have management connectivity through communication channel 513 with OADM devices 561, 562, 563, 564, 565, 566 on WDM layer 560. The WDM layer 560 may be considered to be layer 0.

Similarly to the example shown in FIG. 4, in FIG. 5 the routers 521, 522, 523, 524 may communicate with each other on IP/MPLS layer 520 using logical connectivity links, such as link 529, for example. Further, OTN network elements 541, 542, 543, 544, 545, 546 may communicate with each other on OTN layer 540 using intra-OTN layer links, such as link 549, for example. In addition, OADM devices 561, 562, 563, 564, 565, 566 may communicate with each other on WDM layer 560 using has intra-optical layer connectivity links, such as link 571, for example. Link 571 and similar links may be a fiber span.

OTN network elements 541, 542, 544, 546 may communicate with routers 521, 522, 523, 524 by way of cross-layer port-to-port connectivity using links 531, 532, 533, 534, respectively as shown in FIG. 5. Such port-to-port connectivity may use short or medium reach optical connections and may be similar to port-to-port connectivity shown in FIG. 4.

Similarly, OADM devices 561, 563, 565, 566 may have cross-layer connectivity with OTN network elements 542, 543, 545, 546 over links 554, 553, 552, 551 respectively. OADM device 561 may also have cross-layer connectivity with OTN network element 541 over link 559. In an example, each of links 554, 553, 552, 551 may be a separate collection of N carriers. For example, link 551 may be a collection of carriers $\lambda_{i=1 \ldots N}$. Further, link 552 may be separate collection of carriers $\lambda_{i=1 \ldots N}$. Similarly, links 553, 554 may each be separate collections of carriers $\lambda_{i=1 \ldots N}$. In comparison, link 559 may be a single carrier $\lambda_1$.

Through the example connectivity shown in FIG. 5, the SDN controller may communicate with the network to follow the procedures provided in FIG. 2 and FIG. 3. For example, the SDN controller may communicate with the network using the example connectivity shown in FIG. 5 to determine if the Tpp criterion is met and if the Tp criterion is met.

Figure 6:
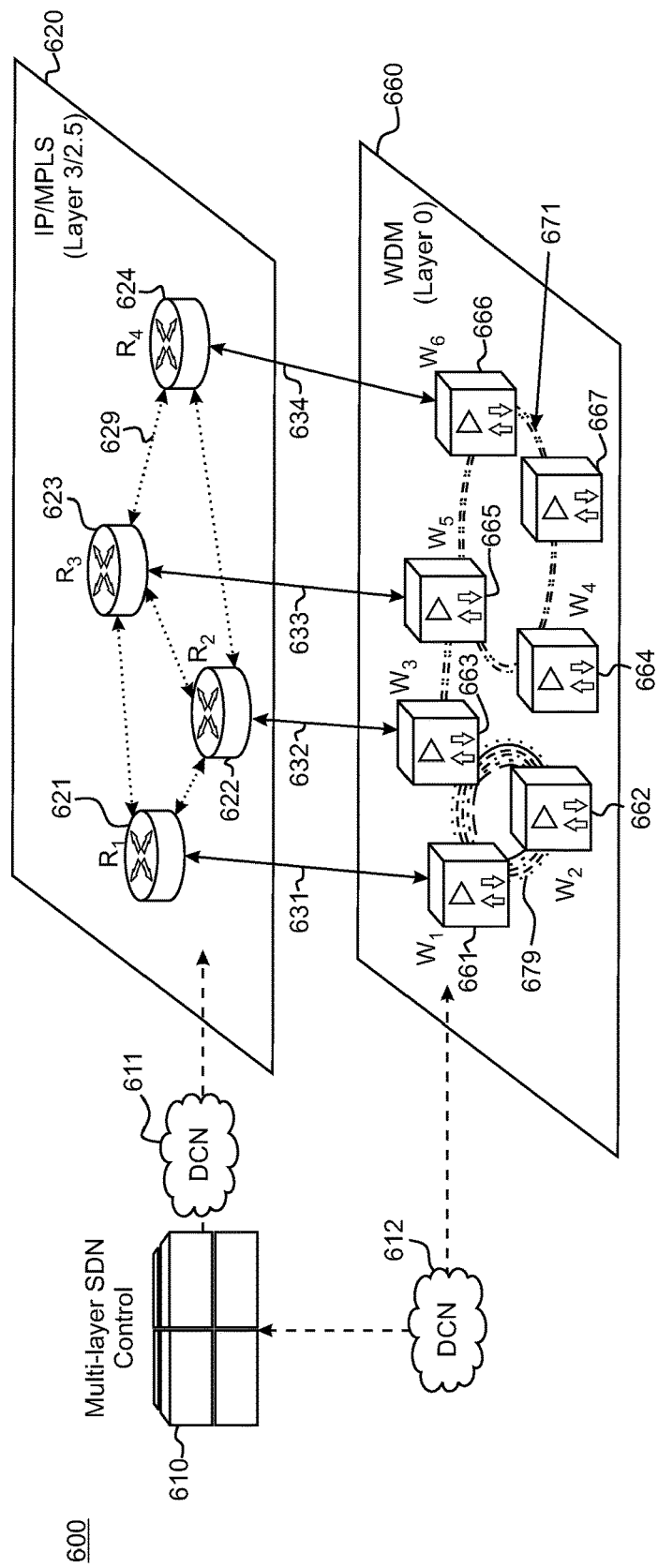
FIG. 6 is a network diagram illustrating an example of an SDN controller providing proactive protection in a multi-fiber network across the IP/MPLS layer and the WDM layer.

FIG. 6 is a network diagram illustrating an example of an SDN controller providing proactive protection in a multi-fiber network across the IP/MPLS layer and the WDM layer. As shown in diagram 600, the SDN controller may communicate over the IP/MPLS layer and the WDM layer in a similar manner to the examples shown in FIG. 5. However, in contrast to the examples shown in FIG. 5, in diagram 600 the SDN controller may not communicate over the OTN layer. Specifically, as shown in diagram 500, the SDN controller 510 may have management connectivity over a management network, such as a DCN, through communication channel 611 with devices such as routers 621, 622, 623, 624 on IP/MPLS layer 620. The IP/MPLS layer 620 may be considered to be layer 3, layer 2.5 or both. In addition, the SDN controller 610 may have management connectivity through communication channel 612 with OADM devices 661, 662, 663, 664, 665, 666 on WDM layer 660. The WDM layer 660 may be considered to be layer 0. The management connectivity may use protocols such as OpenFlow, NETCONF, BGP-LS, PCEP and the like.

Similarly to the examples shown in FIG. 4 and FIG. 5, in FIG. 6 the routers 621, 622, 623, 624 may communicate with each other on IP/MPLS layer 620 using logical connectivity links, such as link 629, for example. In addition, OADM devices 661, 662, 663, 664, 665, 666 may communicate with each other on WDM layer 660 using has intra-optical layer connectivity links, such as link 671, for example. Link 671 and similar links may be a fiber span.

In an example, links, such as link 679, may be a separate collection of N carriers. For example, link 679 may be a collection of carriers $\lambda_{i=1 \ldots N}$. In comparison, link 671 may be a single carrier $\lambda_1$.

OADM devices 661, 662, 663, 664, 665, 666 may communicate with routers 621, 622, 623, 624 by way of cross-layer port-to-port connectivity using links 631, 632, 633, 634, respectively as shown in FIG. 6. Such port-to-port connectivity may use short or medium reach optical connections and may be similar to port-to-port connectivity shown in FIG. 4 and FIG. 5.

Through the example connectivity shown in FIG. 6, the SDN controller may communicate with the network to follow the procedures provided in FIG. 2 and FIG. 3. For example, the SDN controller may communicate with the network using the example connectivity shown in FIG. 6 to determine if the Tpp criterion is met and if the Tp criterion is met.

Figure 7:
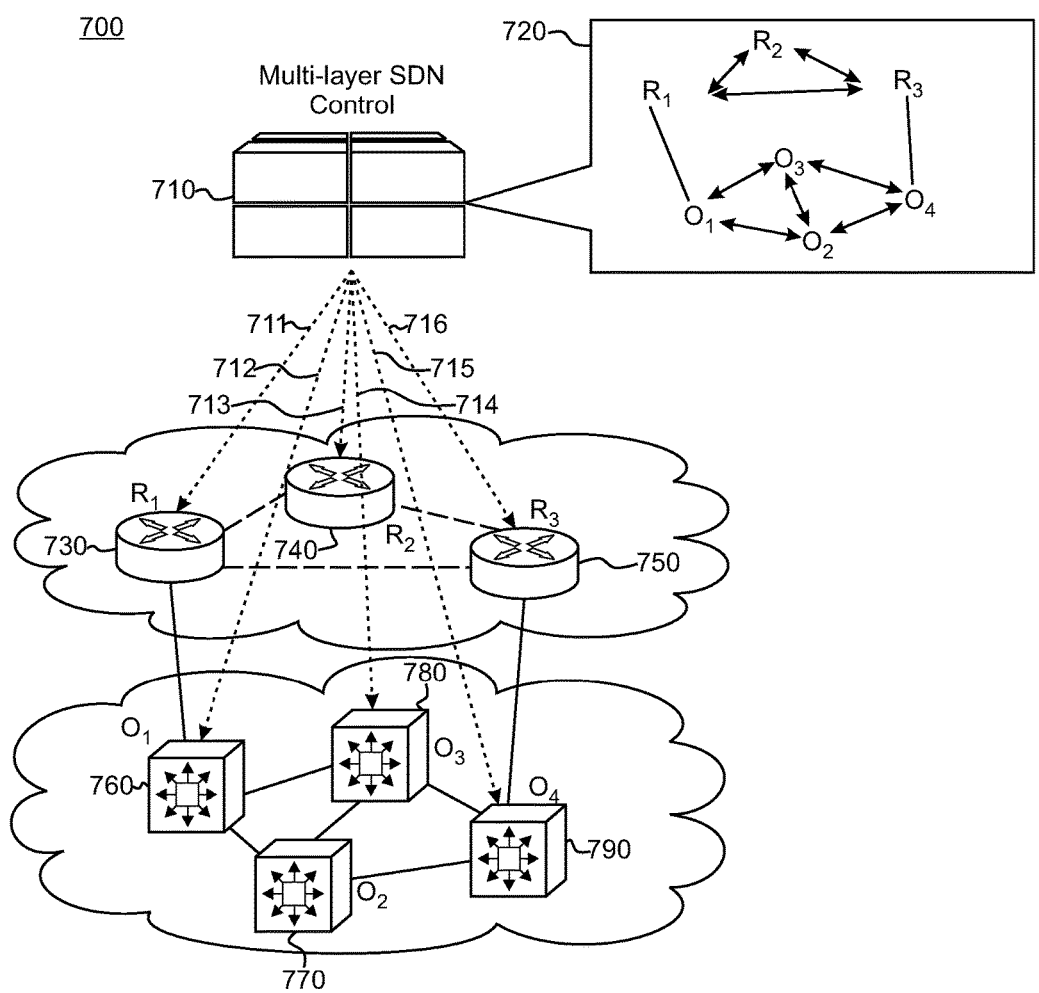
FIG. 7 is a network diagram illustrating an example of a centralized SDN controller providing proactive protection in a multi-fiber network across the IP/MPLS layer and the OTN layer.

FIG. 7 is a network diagram illustrating an example of a centralized SDN controller providing proactive protection in a multi-fiber network across the IP/MPLS layer and the OTN layer. As shown in diagram 700, the centralized SDN controller 710 may have management connectivity over a management network, such as a DCN, through communication channels with devices such as routers 730, 740, 750 on an IP/MPLS layer and such as with OTN network elements 760, 770, 780, 790 on an OTN layer. The management connectivity may use protocols such as OpenFlow, NETCONF, BGP-LS, PCEP and the like. In an example shown in FIG. 7, the centralized SDN controller 710 may communicate over communications channels 711, 713, 716 with routers 730, 740, 750, respectively. Further, the centralized SDN controller 710 may communicate over communications channels 712, 714, 715 with OTN network elements 760, 770, 780, 790, respectively.

In addition, routers 730, 740, 750 may communicate with each other on the IP/MPLS layer using intermediate system to intermediate system (IS-IS) protocol and label distribution protocol (LDP). Also, OTN network elements 760, 770, 780, 790 may communicate with each other on the OTN layer using GMPLS. In addition, routers 730, 740, 750 may communicate with OTN network elements 760, 770, 780, 790 by way of cross layer port-to-port connectivity. In an example shown in FIG. 7, router 730 may communicate with OTN network element 760 and router 750 may communicate with OTN network element 790 by way of cross layer port-to-port connectivity.

In an example shown in FIG. 7, the centralized SDN controller 710 may have full visibility of all of the devices in the network. For example, the centralized SDN controller 710 may have full visibility of the statuses and health indicators of the devices and statuses of the connections among the devices, for routers 730, 740, 750 and OTN network elements 760, 770, 780, 790. As shown in box 720, the centralized SDN controller 710 may have full visibility regarding the connections among the routers and OTN network elements of the network. Further, the centralized SDN controller 710 may determine that status of the connections among the devices and whether each connection is active or not. Further, routers 730, 740, 750 and OTN network elements 760, 770, 780, 790 may not run any control plane protocols and may have minimal peer discovery mechanisms.

Through the example connectivity shown in FIG. 7, the SDN controller may communicate with the network to follow the procedures provided in FIG. 2 and FIG. 3. For example, the SDN controller may communicate with the network using the example connectivity shown in FIG. 7 to determine if the Tpp criterion is met and if the Tp criterion is met.

Figure 8:
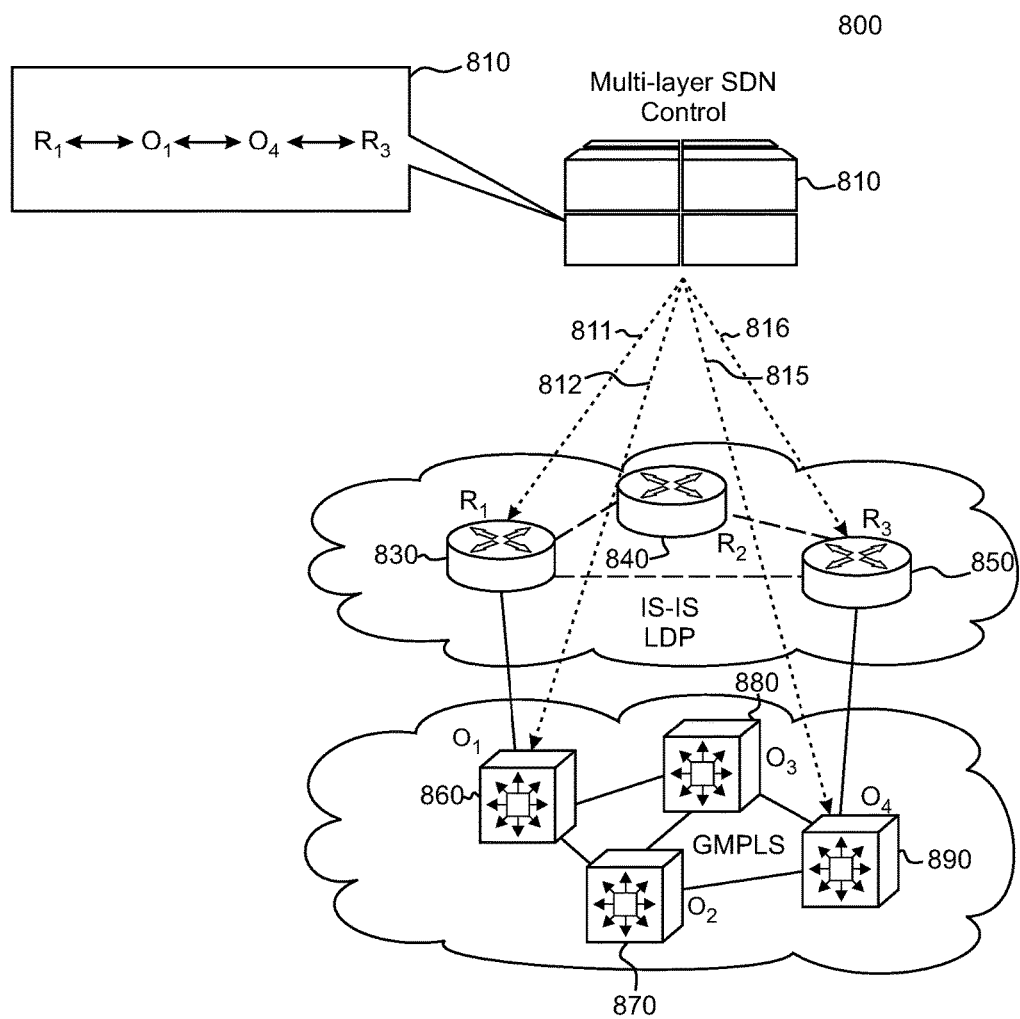
FIG. 8 is a network diagram illustrating an example of a hybrid SDN controller providing proactive protection in a multi-fiber network across the IP/MPLS layer and the OTN layer.

FIG. 8 is a network diagram illustrating an example of a hybrid SDN controller providing proactive protection in a multi-fiber network across the IP/MPLS layer and the OTN layer. As shown in diagram 800, the hybrid SDN controller 810 may have management connectivity over a management network, such as a DCN, through communication channels with devices such as routers 830, 850 on an IP/MPLS layer and such as with OTN network elements 860, 890 on an OTN layer. The management connectivity may use protocols such as OpenFlow, NETCONF, BGP-LS, PCEP and the like. In an example shown in FIG. 8, the hybrid SDN controller 810 may communicate over communications channels 811, 716 with routers 830, 850, respectively, and over communications channels 812, 815 with OTN network elements 860, 890, respectively.

In addition, routers 830, 840, 850 may communicate with each other on the IP/MPLS layer using intermediate system to intermediate system (IS-IS) protocol and label distribution protocol (LDP). Also, OTN network elements 860, 870, 880, 890 may communicate with each other on the OTN layer using GMPLS. In addition, routers 830, 840, 850 may communicate with OTN network elements 860, 870, 880, 890 by way of cross layer port-to-port connectivity. In an example shown in FIG. 8, router 830 may communicate with OTN network element 860 and router 850 may communicate with OTN network element 890 by way of cross layer port-to-port connectivity.

In an example shown in FIG. 8, the hybrid SDN controller 810 may have partial visibility of the devices in the network. For example, the hybrid SDN controller 810 may have partial visibility of the status of the devices and status of the connections among the devices. For example the hybrid SDN controller 810 may have visibility only of the edge nodes in the network, such as routers 830, 850 and OTN network elements 860, 890. As shown in box 820, the hybridSDN controller 810 may have partial visibility regarding the connections among the routers and OTN network elements of the network. For example, the hybridSDN controller 810 may have visibility of the edge nodes in the network, as shown in box 820. Further, the hybridSDN controller 810 may determine that status of the connections among the edge nodes and whether each such connection is active or not. Further, routers 830, 840, 850 and OTN network elements 860, 870, 880, 890 may run routing and signaling protocols. Also, the hybrid SDN controller 810 may indicate the intent to re-route traffic to the edge nodes. The edge nodes may in turn invoke embedded control plane functions for service setup.

Through the example connectivity shown in FIG. 8, the SDN controller may communicate with the network to follow the procedures provided in FIG. 2 and FIG. 3. For example, the SDN controller may communicate with the network using the example connectivity shown in FIG. 7 to determine if the Tpp criterion is met and if the Tp criterion is met.

FIG. 9 is a network diagram illustrating an example of a multi-layer SDN controller providing proactive protection in a multi-fiber network, and the platforms and applications of the SDN controller. As shown in diagram 800, the multi-layer SDN controller 910 may have management connectivity over a management network, such as DCN 920, through communication channels with devices in a network, such as first network 930. The devices in the network may include a variety of devices, such as routers on an IP/MPLS layer, OTN network elements on an OTN layer, OADM devices on a WDM layer and optical muxponders on layer 0. Overall, the network may include one or more of layer 0, layer 1 and layer 3.

Further, the multi-layer SDN controller 910 may run controller applications 918 and functions on controller platform 912. The controller applications 918 and functions on controller platform 912 may run on physical servers or virtual machine based servers, and may use a network traffic engineering database 940 and a time series database 950. The network traffic engineering database 940 may house information concerning topology states of each layer and cross-layer connectivity, used and available bandwidth resources on links and shared risk groups (SRGs). An SRG may include a collection of entities, such as links, equipment, buildings, conduits, and the like, which indicate a shared fate. For example, failure of a particular SRG or member of the particular SRG may impact all other entities which use the particular SRG. the multi-layer SDN controller 910 may utilize the data in the network traffic engineering database 940 to compute end-to-end level 3 node to level 3 node paths. The time series database 950 may contain performance monitoring data from network devices such as packet layer statistics, OTN/WDM statistics, and the like. Packet layer statistics may include Octets, Packet, ErroredOctets, BadPackets, Jumbo Frames, and the like. OTN/WTM statistics may include pre-FEC-Q, pre-FEC-BER, PMD, CD, OutputPower, and the like. The performance monitoring data may be timestamped to allow the multi-layer SDN controller 910 to build a temporal profile of the collected data.

The controller applications 918 may include diagnostics applications, data analytics applications, multi-layer path computation element protocol (PCE) applications, proactive re-route engine applications and plug-in applications. The plug-in applications may use functions such as request functions, response functions, hypertext transport protocol secure (https) functions, RESTful functions and JavaScript object notation (JSON) functions. Further, the other applications in the controller applications 918 may use the plug-in application functions to draw on functions of the controller platform 912.

In addition, the controller platform 912 may include security functions, which may include Open Authorization (OAuth), secure sockets layer (SSL), and transport layer security (TLS) functions. Also, the controller platform 912 may include: adaptation functions, such as inventory functions, provisioning functions and monitoring functions; inventory functions, such as SubNetwork functions, Network Element (NE) functions and Port functions; and provisioning functions, such as LSP functions, SubNetwork Connection (SNC) functions and cross-connects (XCON) functions. Further, the controller platform 912 may provide notification functions as well as virtualization and overlay functions. Moreover, the controller platform 912 may provide port monitoring functions, such as state monitoring, fault monitoring and configuration monitoring. In order to communicate with the first network 930 and possibly another network, such as a second network 913, the controller platform 912 may use a NE communication layer, which may use protocols such as OpenFlow, NETCONF, BGP-LS, PCEP and the like, as well as gRPCs and the like.

Figure 10:
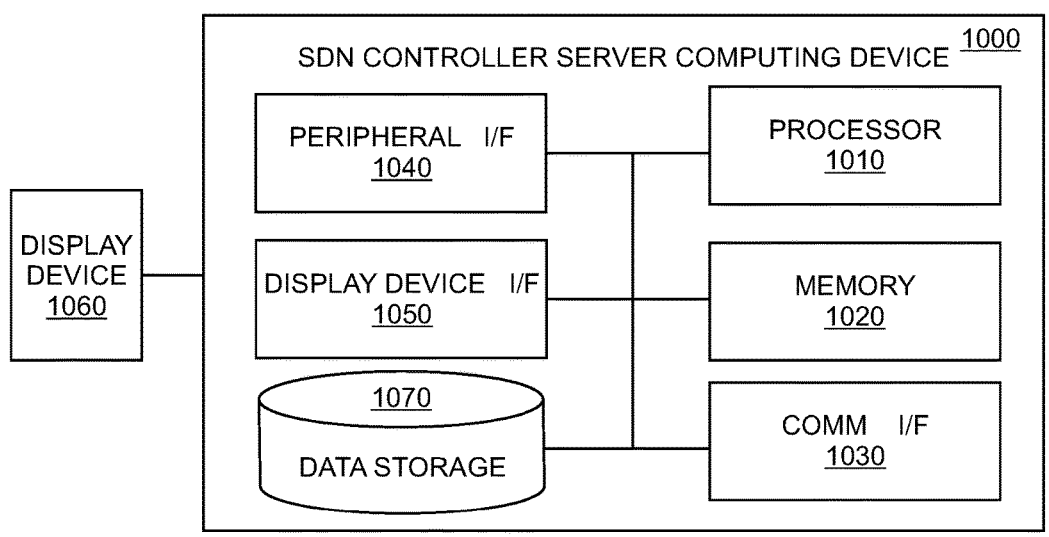
FIG. 10 is a diagram of an example SDN controller server computing device that may be used to implement one or more features described herein as performed by the SDN controller.

FIG. 10 is a diagram of an example SDN controller server computing device that may be used to implement one or more features described herein as performed by the SDN controller. The SDN controller server computing device 1000 may include a processor 1010, a memory device 1020, a communication interface 1030, a peripheral device interface 1040, a display device interface 1050, and a data storage device 1070. FIG. 10 also shows a display device 1060, which may be coupled to or included within the SDN controller server computing device 1000.

As used herein, the term "processor" refers to a device such as a single- or multi-core processor, a special purpose processor, a conventional processor, a Graphics Processing Unit (GPU), a digital signal processor, a plurality of microprocessors, one or more microprocessors in association with a DSP core, a controller, a microcontroller, one or more ASICs, one or more Field Programmable Gate Array (FPGA) circuits, any other type of integrated circuit (IC), a system-on-a-chip (SOC), a state machine, or a similar type of device. Processor 1010 may be or include any one or several of these devices.

The memory device 1020 may be or include a device such as a Random Access Memory (RAM), Dynamic RAM (D-RAM), Static RAM (S-RAM), other RAM or a flash memory. Further, memory device 1020 may be a device using a computer-readable medium. The data storage device 1070 may be or include a hard disk, a magneto-optical medium, a solid-state drive (SSD), an optical medium such as a compact disk (CD) read only memory (ROM) (CD-ROM), a digital versatile disk (DVDs), or Blu-Ray disc (BD), or other type of device for electronic data storage. Further, data storage device 1070 may be a device using a computer-readable medium. As used herein, the term "computer-readable medium" refers to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

The communication interface 1030 may be, for example, a communications port, a wired transceiver, a wireless transceiver, and/or a network card. The communication interface 1030 may be capable of communicating using technologies such as SDN technology, wide area network (WAN) technology, SD-WAN technology, Ethernet, Gigabit Ethernet, fiber optics, microwave, xDSL (Digital Subscriber Line), Institute of Electrical and Electronics Engineers (IEEE) 802.11 technology, Wireless Local Area Network (WLAN) technology, wireless cellular technology, or any other appropriate technology.

The peripheral device interface 1040 is configured to communicate with one or more peripheral devices. The peripheral device interface 1040 operates using a technology such as Universal Serial Bus (USB), PS/2, Bluetooth, infrared, serial port, parallel port, FireWire and/or other appropriate technology. The peripheral device interface 1040 may, for example, receive input data from an input device such as a keyboard, a keypad, a mouse, a trackball, a touch screen, a touch pad, a stylus pad, a detector, a microphone, a biometric scanner, or other device. The peripheral device interface 1040 may provide the input data to the processor 1010. The peripheral device interface 1040 may also, for example, provide output data, received from the processor 1010, to output devices such as a speaker, a printer, a haptic feedback device, one or more lights, or other device. Further, an input driver may communicate with the processor 1010, peripheral device interface 1040 and the input devices, and permit the processor 1010 to receive input from the input devices. In addition, an output driver may communicate with the processor 1010, peripheral device interface 1040 and the output devices, and permit the processor 1010 to provide output to the output devices. One of ordinary skill in the art will understand that the input driver and the output driver may or may not be used, and that the SDN controller server computing device 1000 will operate in the same manner or similar manner if the input driver, the output driver or both are not present.

The display device interface 1050 may be an interface configured to communicate data to display device 1060. The display device 1060 may be, for example, a monitor or television display, a plasma display, a liquid crystal display (LCD), or a display based on a technology such as front or rear projection, light emitting diodes (LEDs), organic LEDs (OLEDs), or Digital Light Processing (DLP). The display device interface 1050 may operate using technology such as Video Graphics Array (VGA), Super VGA (S-VGA), Digital Visual Interface (DVI), High-Definition Multimedia Interface (HDMI), Super Extended Graphics Array (SXGA), Quad Extended Graphics Array (QXGA), or other appropriate technology. The display device interface 1050 may communicate display data from the processor 1010 to the display device 1060 for display by the display device 1060. Also, the display device may connect with speakers and may produce sounds based on data from the processor 1010. As shown in FIG. 10, the display device 1060 may be external to the SDN controller server computing device 1000, and coupled to the SDN controller server computing device 1000 via the display device interface 1050. Alternatively, the display device 1060 may be included in the SDN controller server computing device 1000. An instance of the SDN controller server computing device 1000 of FIG. 10 may be configured to perform any feature or any combination of features of the system and method described herein as performed by the SDN controller.

It should be understood that many variations are possible based on the examples described herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor, a plurality of microprocessors, one or more microprocessors in association with a DSP core, a controller, a microcontroller, metal-oxide semiconductor field-effect transistors (MOSFETs), ASICs, FPGAs circuits, any other type of IC, and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor that implements aspects of the embodiments.

The suitable processors may include circuitry to implement the methods provided herein. The circuitry may include receiving circuitry, processing circuitry and transmitting circuitry.

The methods and flow charts provided herein may be implemented in a computer program, software, or firmware incorporated in a non-transitory computer-readable storage medium for execution by a general purpose computer or a processor. Examples of non-transitory computer-readable storage media, include, but are not limited to, a ROM, a RAM, a register, cache memory, semiconductor memory devices, magnetic media such as internal hard disks and removable disks, magneto-optical media, and optical media such as CD-ROM disks, and digital versatile disks (DVDs).

Further, the devices according to various embodiments described herein may be interspersed among other devices depending on the functionality of the microelectronic device. In addition, the number and components of the devices may vary depending on the functionality of the microelectronic device. By way of example, the number of servers, which may be virtual servers, acting as the SDN controller may be one or may be several servers, such as tens of servers.

What is claimed is:

1. A method of pro-active protection of packet-optical transport in a software defined network (SDN) controller, the method comprising:
    defining, by the SDN controller, a proactive protection threshold criterion based on a plurality of optical system performance metrics;
    collecting, by the SDN controller, at least one measurement for each of the plurality of optical system performance metrics;
    determining, by the SDN controller, whether the proactive protection threshold criterion is met based on at least one of the collected measurements;
    selecting, by the SDN controller, a protection mechanism and defining a protection threshold criterion on a condition that the proactive protection threshold criterion is met;
    initiating, by the SDN controller, one or more proactive protection events based on the selected protection mechanism;
    determining, by the SDN controller, whether the protection threshold criterion is met; and
    implementing, by the SDN controller, one or more protection events on a condition that the protection threshold criterion is met.

2. The method of claim 1, further comprising:
    aborting, by the SDN controller, any previously initiated and currently activated proactive protection events on a condition that the proactive protection threshold criterion is not met.

3. The method of claim 1, further comprising:
further collecting, by the SDN controller, at least one measurement for each of the plurality of optical system performance metrics on a condition that the proactive protection threshold criterion is not met.

4. The method of claim 1, wherein the SDN controller includes a proactive decision engine.

5. The method of claim 1, wherein the SDN controller is a hybrid SDN controller.

6. The method of claim 1, wherein the plurality of optical system performance metrics include at least two of Q-Factor metrics, transmission metrics, reception metrics, photonic integrated circuit (PIC) metrics, digital signal processing (DSP) metrics, power metrics, chromatic dispersion metrics, signal to noise ratio metrics, bit error rate (BER) metrics, wavelength division multiplexing (WDM) metrics, crosstalk metrics, optical amplification gain level metrics, Erbium Doped Fiber Amplifier (EDFA) gain level metrics, Raman gain level metrics, optical fiber characteristic metrics, Optical Power Monitor (OPM) metrics, Optical Time Domain Reflectometry (OTDR) metrics, multi-protocol label switching (MPLS) tunnel utilization metrics, Optical Transport Network (OTN) tunnel utilization metrics and Label Switched Path (LSP) round-trip delay (RTD) metrics.

7. The method of claim 1, wherein the proactive protection threshold criterion is met based on a Q-Factor of less than or equal to 6.5 dB.

8. The method of claim 1, wherein the proactive protection threshold criterion is met based on the collected measurements of a plurality of carriers.

9. The method of claim 1, wherein at least one of the proactive protection events is proactive protection switching.

10. The method of claim 9, wherein the proactive protection switching is performed in a WDM layer.

11. A software defined network (SDN) controller for pro-active protection of packet-optical transport, the SDN controller comprising:
a processor configured to define a proactive protection threshold criterion based on a plurality of optical system performance metrics;
a communication interface operatively coupled to the processor, the communication interface and the processor configured to collect at least one measurement for each of the plurality of optical system performance metrics;
the processor configured to determine whether the proactive protection threshold criterion is met based on at least one of the collected measurements;
the processor configured to select a protection mechanism and defining a protection threshold criterion on a condition that the proactive protection threshold criterion is met;
the processor and the communication interface configured to initiate one or more proactive protection events based on the selected protection mechanism;
the processor configured to determine whether the protection threshold criterion is met; and
the processor and the communication interface configured to implement one or more protection events on a condition that the protection threshold criterion is met.

12. The SDN controller of claim 11, further comprising:
the processor and the communication interface configured to abort any previously initiated and currently activated proactive protection events on a condition that the proactive protection threshold criterion is not met.

13. The SDN controller of claim 11, further comprising:
the processor and the communication interface configured to further collect at least one measurement for each of the plurality of optical system performance metrics on a condition that the proactive protection threshold criterion is not met.

14. The SDN controller of claim 11, wherein the SDN controller includes a proactive decision engine.

15. The SDN controller of claim 11, wherein the SDN controller is a hybrid SDN controller.

16. The SDN controller of claim 11, wherein the plurality of optical system performance metrics include at least two of Q-Factor metrics, transmission metrics, reception metrics, photonic integrated circuit (PIC) metrics, digital signal processing (DSP) metrics, power metrics, chromatic dispersion metrics, signal to noise ratio metrics, bit error rate (BER) metrics, wavelength division multiplexing (WDM) metrics, crosstalk metrics, optical amplification gain level metrics, Erbium Doped Fiber Amplifier (EDFA) gain level metrics, Raman gain level metrics, optical fiber characteristic metrics, Optical Power Monitor (OPM) metrics, Optical Time Domain Reflectometry (OTDR) metrics, multi-protocol label switching (MPLS) tunnel utilization metrics, Optical Transport Network (OTN) tunnel utilization metrics and Label Switched Path (LSP) round-trip delay (RTD) metrics.

17. The SDN controller of claim 11, wherein the proactive protection threshold criterion is met based on a Q-Factor of less than or equal to 6.5 dB.

18. The SDN controller of claim 11, wherein the proactive protection threshold criterion is met based on the collected measurements of a plurality of carriers.

19. The SDN controller of claim 11, wherein at least one of the proactive protection events is proactive protection switching.

20. The SDN controller of claim 11, wherein the proactive protection switching is performed in a WDM layer.

* * * * *